Jan. 30, 1968 P. SVEDBERG 3,366,793

OPTICALLY COUPLED SEMI-CONDUCTOR REACTIFIER WITH INCREASED BLOCKING VOLTAGE

Filed June 26, 1964 4 Sheets-Sheet 1

INVENTOR.
PER SVEDBERG

BY Bailey, Stephens & Huettig

OPTICALLY COUPLED SEMI-CONDUCTOR REACTIFIER WITH INCREASED BLOCKING VOLTAGE

Filed June 26, 1964 4 Sheets-Sheet 2

INVENTOR.
PER SVEDBERG

BY Bailey, Stephens & Huettig

Jan. 30, 1968 P. SVEDBERG 3,366,793

OPTICALLY COUPLED SEMI-CONDUCTOR REACTIFIER WITH INCREASED BLOCKING VOLTAGE

Filed June 26, 1964 4 Sheets-Sheet 3

INVENTOR.
PER SVEDBERG
BY Bailey, Stephens & Huettig

INVENTOR.
PER SVEDBERG
BY Bailey, Stephens & Huettig

United States Patent Office 3,366,793
Patented Jan. 30, 1968

3,366,793

OPTICALLY COUPLED SEMI-CONDUCTOR REACTIFIER WITH INCREASED BLOCKING VOLTAGE

Per Svedberg, Vallingby, Sweden, assignor to Allmänna Svenska Electriska Aktiebolaget Vasteras, Sweden, a corporation of Sweden Filed June 26, 1964, Ser. No. 378,206
Claims priority, application Sweden, July 1, 1963, 7,257/63
8 Claims. (Cl. 250—211)

ABSTRACT OF THE DISCLOSURE

A rectifier means comprising at least one rectifying semi-conductor body connected to a voltage source; said body has a middle zone with low conductivity and end zones of mutually opposite conductivity type arranged on both sides of the middle zone and with high conductivity in relation to that of the middle zone. A source of light photons connected in series with the semi-conductor body introduces light photons into the middle zone so that the conductivity of the middle zone is raised during the forward period of the semi-conductor body. The middle zone has a width substantially greater than the diffusion length.

A power diode of the construction now generally used is built up of three zones which are usually indicated $P^+$-, S- and $N^+$-zones. The $P^+$-zone conducts well and is highly P-doped, the $N^+$-zone conducts well and is highly N-doped. Between these is a high-ohmic weakly doped zone S of P- or N-type.

If the doping in the S-zone is sufficiently small, the blocking voltage of the diode is proportional to its width. In order that the diode may have a low forward voltage drop the conductivity of the S-zone must be able to increase considerably. This occurs by holes from the $P^+$-zone and electrons from the $N^+$-zone being injected into the S-zone during the forward period. A condition however is that the lifetime of the injected holes and electrons is so great that they have time to diffuse through the whole zone before they recombine.

The lifetime of the holes and electrons is limited even in a perfect material and may not in addition be allowed to exceed about 50 $\mu$s. for connection technique reasons. The S-zone may therefore only be given a limited width, which means that the blocking voltage which can be attained is limited. For silicon diodes the optimal blocking voltage lies at 2–3 kv. With higher blocking voltages the forward voltage drop increases so much that the rectified power per surface unit of the silicon sinks.

In a thyristor the conditions are similar. A thyristor is built up of four zones, $N^+$-, P-, N-, $P^+$-zones. The two outer zones conduct well and in the forward direction of the thyristor they inject holes and electrons into the two inner high-ohmic centre zones, which two latter zones are in the following part of the application commonly called the middle zones. The condition for good forward characteristics is in principle the same as for the diodes. Even in the thyristor the blocking voltage is largely proportional to the thickness of the middle zone. However, the same blocking voltage as in a diode cannot be attained. The optimal blocking voltage is about 1–1.5 kv.

The present invention deals with the problem of attaining a decreased forward voltage drop in a rectifying semi-conductor body and thereby simultaneously enabling the attainment of increased blocking voltage. The intended result is attained by increasing the generation of holes and electrons in the middle zone of the semi-conductor body.

More particularly the invention relates to a method of decreasing the forward voltage drop in a rectifying semi-conductor body, such as a rectifier diode or a thyristor, with a middle zone with low conductivity and end zones of mutually opposite conductivity types arranged on both sides of the middle zone and with high conductivity in relation to that of the middle zone. The invention is characterised in that the conductivity of the intermediate zone of the rectifying semi-conductor body is raised during the forward period of the semi-conductor body by subjecting it to light of photons with a substantial capacity to generate hole-electron pairs in the middle zone. By light of photons with a substantial capacity to generate hole-electron pairs in the middle zone is meant a light of photons with such intensity and with such wavelength that the conductivity of the middle zone during the forward period is increased by at least 10%. The wavelength should be shorter than the characteristic absorption wavelength of the semi-conductor subjected to light which is e.g. for silicon 12,000 A.

A means for carrying out the method may advantageously consist of a rectifier device comprising at least one rectifying semi-conductor body, such as a rectifier diode or a thyristor, in which at least one light-emitting diode is arranged to subject the middle zone of the rectifying semi-conductor body to light photons.

By a light-emitting diode is meant a diode in which a large part, of the magnitude of 10% or more, of the recombination energy is converted to photons. Examples of such diodes are GaAs-diodes, GaAsP diodes with varying ratios between As- and P-content, GaSb-diodes, InP-diodes and GaP-diodes. In the light-emitting diodes in the device according to the invention the light-emission occurs normally as a result of direct recombination between conduction band and valence band or impurity state levels immediately adjacent to the conduction and valence bands. In contrast to this, in Ge- and Si-diodes only a minor part of the recombination energy is converted into radiation. In these two last-named types of diodes the recombination of holes and electrons takes place indirectly through photons or through recombination levels in the forbidden energy gap.

It has earlier been proposed to make use of emitted light from a germanium diode in order to change the resistivity in a silicon crystal without a blocking layer. Since the light emitted from the germanium diode has a lower energy than that required to excite electrons from the valence band of the silicon right up to the conduction band, the silicon must in this case be doped with impurities which supply energy levels between these bands, i.e. in the forbidden energy gap. Such a silicon crystal has poor blocking characteristics partly since it does not contain any P-N-junctions, partly since it must be doped from said impurities. In this known case quite a different problem from that according to the invention is thus dealt with. Further, the diode used for light emission is quite useless for the function which the light-emitting diode according to the invention has.

The resistivity in unlighted condition in the middle zone of the semiconductor body may advantageously lie at more than 100 ohm cm., preferably at about 10,000 ohm cm., and in its end zones at about 0.001–0.1 ohm cm., preferably 0.001–0.01 ohm cm.

When using some of the named light-emitting diodes the forward voltage drop in this may lie at about 1–3 v. and the required current density in the range $10^2$–$10^5$ a./cm.$^2$. The wavelength of the emitted light in a GaAs-diode lies at about 8500 A.

It is especially suitable to connect the light-emitting diode or a group of series-connected light-emitting diodes, if such are used, in series with the rectifying semi-conductor body, since the emission of photons from the light-emitting diode then occurs exactly during the forward period of the rectifying body.

In order to increase the choice in regard to placing of the light-emitting diode in relation to the rectifying semi-conductor body so that the middle zone of the semi-conductor body is subjected to the required light photons, it may be suitable to incorporate in the system a light-reflecting device, e.g. a prisma or in another way with known optical methods to direct the emitted light towards the middle zone of the rectifying semi-conductor body.

The invention will be described in more detail in the following by describing a number of embodiments with reference to the accompanying drawing with schematical figures showing means for carrying out the method according to the invention.

Figure 8:
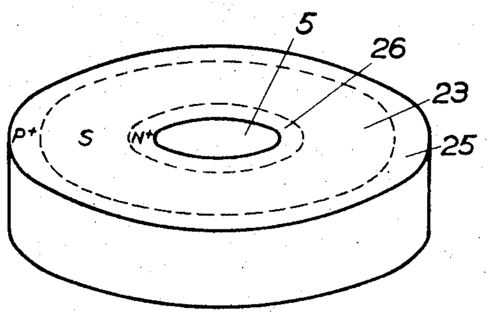
FIGURE 8 shows in perspective a means where a light-emitting diode is arranged at one opening of a rectifying semi-conducting body with a central hole.
Figure 9:
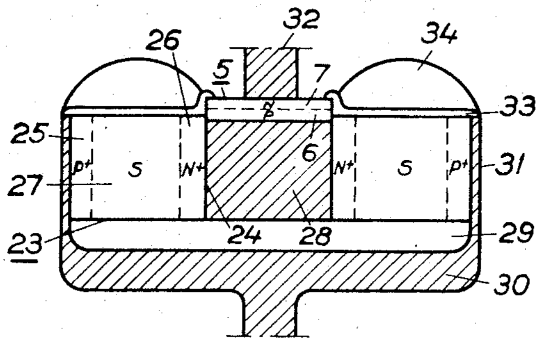

FIGURE 9 constitutes a cross section of the means according to FIGURE 8 and shows in addition the base of the semi-conductor body.

Figure 10:
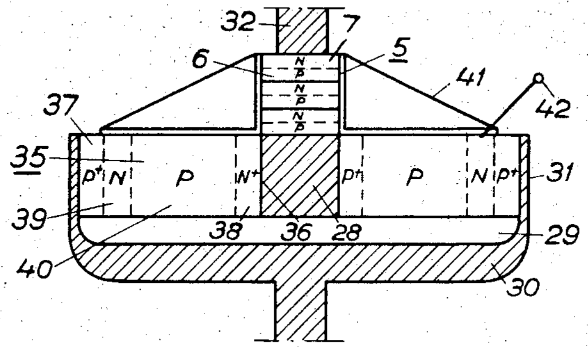

FIGURE 10 shows a means of the same type as that according to FIGURES 8 and 9, where instead of a light-emitting diode a number of series-connected light-emitting diodes are used.

Figure 11:
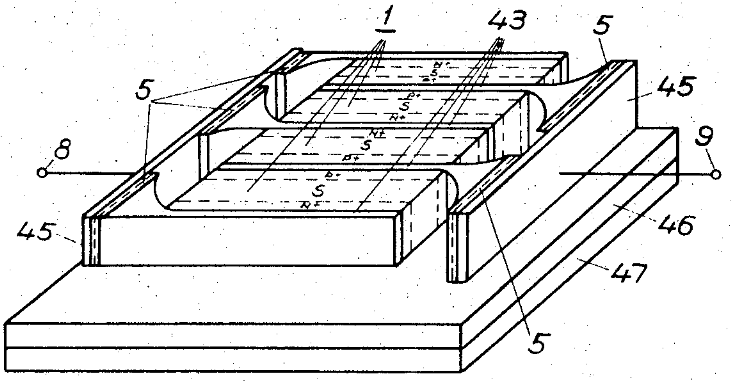

FIGURE 11 shows in perspective a means with several parallellepipedal rectifying semi-conductor bodies arranged with intermediate conducting layers, which are connected with light-emitting diodes arranged outside the edge surfaces of the rectifying semi-conductor bodies.

Figure 12:
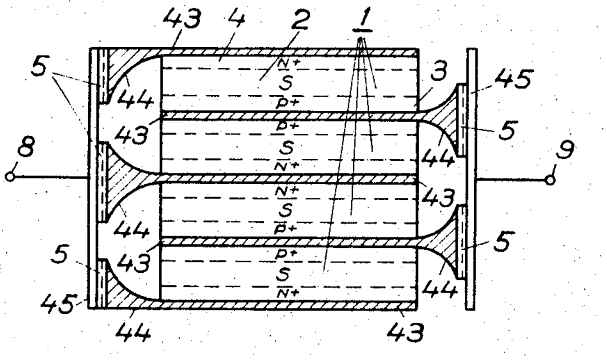

FIGURE 12 constitutes a cross section of a part of the means according to FIGURE 11.

Figure 13:
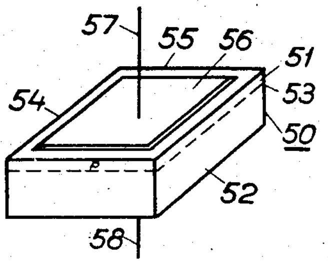
Figure 14:
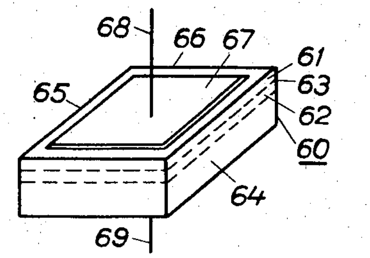

FIGURES 13 and 14 show in perspective in more detail embodiments of light-emitting diodes.

Figure 15:
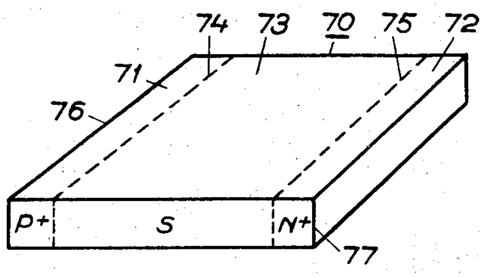
Figure 16:
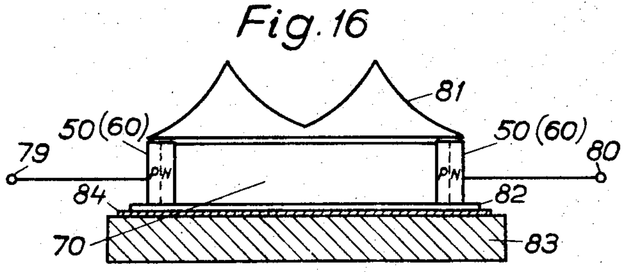

FIGURE 15 shows in perspective in more detail an embodiment of a rectifying semi-conductor body and FIGURE 16 a rectifier device with semi-conductor bodies according to FIGURE 15 as components.

Figure 1:
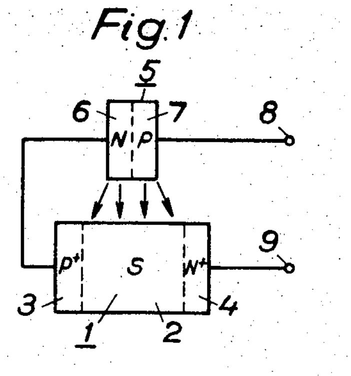
FIGURES 1, 2 and 3 show means where a light-emitting diode is arranged to subject the middle zone of a rectifier diode, a photo-controlled thyristor and an emitter-controlled thyristor directly to light photons.

The parallellepipedal rectifier diode 1 according to FIGURE 1 has a middle zone 2 with low conductivity and a highly P-doped end zone 3 and a highly N-doped end zone 4, both with high conductivity. The middle zone 2 is subjected to light photons from the light-emitting diode 5 with the N-zone 6 and the P-zone 7. The light-emitting diode 5 is connected in series with the rectifier diode 1 between the main contacts 8 and 9 and further placed exactly above the middle zone of the rectifier diode. The light-emitting diode is further arranged with its current direction geometrically parallel with the current direction of the rectifier diode.

Figure 2:
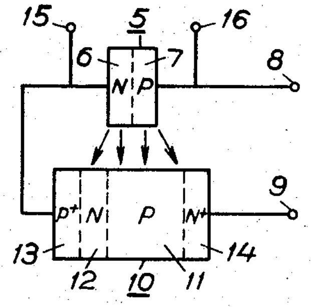

The parallelledipedal semi-conductor body 10 of the photo-controlled thyristor in FIGURE 2 has a middle zone which consists of a weakly P-doped centre zone 11 and a weakly N-doped centre zone 12. Further, it has a highly P-doped end zone 13 and a highly N-doped end zone 14. The light-emitting diode 5 which is connected in series with the semiconductor body and placed above the middle zone consisting of the centre zones 11 and 12, subjects the middle zone to light photons. The contacts for the control current are indicated by 15 and 16.

Figure 3:
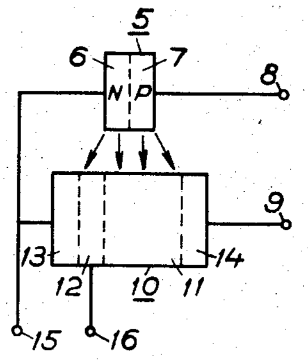

FIGURE 3 shows an emitter-controlled thyristor which with regard to placing of the light-emitting diode 5 corresponds to the photo-controlled thyristor shown in FIGURE 2.

Figure 4:
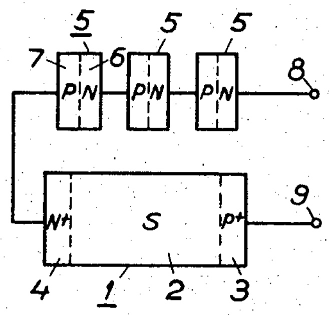
FIGURES 4 and 6 show means where a group of light-emitting diodes are arranged to subject the middle zone a rectifier diode and an emitter-controlled thyristor directly to light of photons.

The arrangement shown in FIGURE 4 differs from the arrangement according to FIGURE 1 only in that instead of a single light-emitting diode 5 it contains a group of such series-connected diodes. By using varying numbers of light-emitting diodes the radiation intensity can be adapted according to need. The use of several light-emitting diodes enables also a more effective radiation of the middle zone of the rectifer diode.

Figure 5:
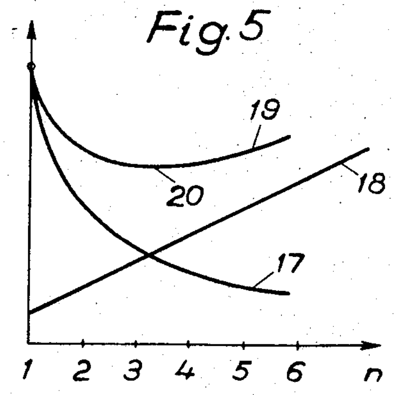
FIGURE 5 shows a diagram where the voltage drop over a series-connected system of a rectifier diode and light-emitting diodes is placed as a function of the number of light-emitting diodes.

From the diagram in FIGURE 5 it is evident what number of light-emitting diodes 5 should normally suitably be chosen. In the diagram the voltage U is placed on the ordinate axis and the number of series-connected light-emitting diodes, *n*, on the abscissa axis. Curve 17 shows the vlotage drop $U_1$ over the rectifier diode 1 according to FIGURE 4 in forward direction, and curve 18 the voltage drop $n \cdot U_e$ over the light-emitting diodes, each of which give the voltage drop $U_e$. Curve 19 is obtained by adding the curves 17 and 18 and shows the total voltage drop over the light-emitting electrodes 5 and the rectifier diode 1. From the minimum point 20 on curve 19 the number of light emitting diodes 5 can be read, which should be chosen.

Figure 6:
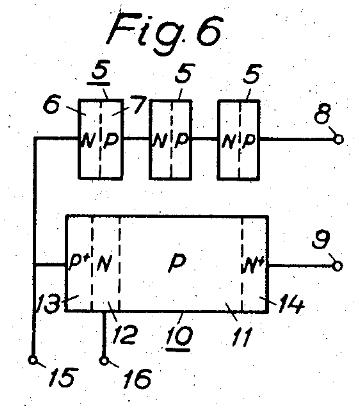

The arrangement according to FIGURE 6 differs from that according to FIGURE 3 only in that instead of a single light-emitting diode 5 it contains a group of such series-connected diodes.

In the FIGURES 1–6 the light-emitting diodes and the rectifying semi-conductor diodes are arranged in such relation to each other that their current directions are geometrically parallel. In certain cases it may be desirable from a light-saving viewpoint to arrange the light-emitting diodes so that their current directions are geometrically perpendicular to the current directions of the rectifying diodes. It is then preferable to make at least the zone of the light-emitting diodes, which is facing the rectifying semi-conductor bodies, especially thin in order to give this zone a high light permeability.

Figure 7:
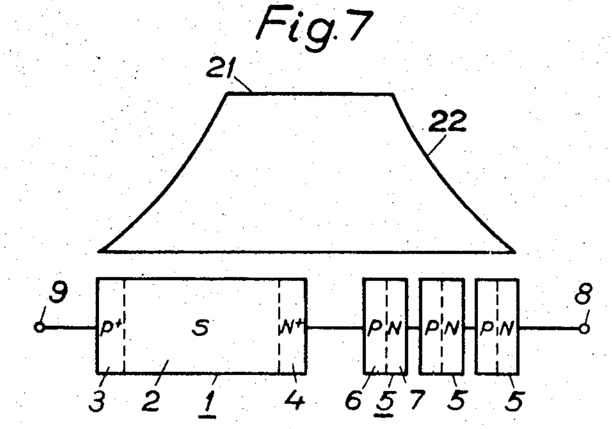
FIGURE 7 shows a means with a prisma which directs photons generated by light-emitting diodes towards a rectifying semi-conductor body.

In the arrangement according to FIGURE 7 the rectifier diode 1 and the group of light-emitting diodes 5 are placed beside each other on substantially the same level, e.g. on a common base. The light from the diodes 5 is directed towards and spread over the intermediate zone 2 of the rectifier diode 1 with the help of a prism 21 with curved surfaces 22.

The rectifier diode in the arrangement according to FIGURES 8 and 9, of which FIGURE 8 only shows the rectifier diode itself and the light-emitting diode, while FIGURE 9 also shows important auxiliary means, has the form of a round disc 23 with a central hole 24. The one end zone 25 of the rectifier diode is arranged along the edge of the disc and its other end zone 26 along the wall of the central hole. The middle zone is indicated 27. A light-emitting diode 5 is arranged in the opening of the central hole. The diode 5 with the metal piece 28 placed in the central hole is series-connected to the rectifier diode 23. The rectifier diode is arranged on an electrically insulating layer 29 of a material with good heat conductivity, e.g. of beryllium oxide, which in its turn rests on a metal base 30. The metal base is conductively connected at 31 with the outer end zone 25 of the rectifier diode. Supply and discharge of electrical current occurs through the metal base 30 and the connection conduit 32. The upper side of the rectifier diode is provided with a thin layer of insulating and transparent material 33, e.g. quartz, which is applied by means of cathodic sputtering, and with an insulating body 34 of for example plastic material arranged above this, which at the same time may also act as light-reflecting means. The means 33 and 34 direct and spread the light which is emitted from the diode 5.

The thyristor according to FIGURE 10 has also the form of a disc 35 with a central hole 36. As in the foregoing case the one end zone 37 is arranged along the edge of the disc and the other 38 along the central hole. The centre zones, which together form the middle zone are indicated at 39 and 40. A group of series-connected light-emitting diodes 5 are arranged adjacent the one opening of the central hole. The current path through the device is as described for the device according to FIGURE 9. The light from the diodes 5 is spread over the centre zones 39 and 40 by the prism 41 arranged above the semi-conductor body 35. The gate electrode contact of the thyristor is indicated 42.

The arrangement in FIGURE 11, the central part of which is shown in cross section in FIGURE 12, consists of several adjacently arranged rectifier diodes 1 with parallellepipedal form. End zones of the same conductivity type are facing each other and connected with a conducting, e.g. metallic intermediate layer 43. Light-emitting diodes 5 are arranged outside the edge surfaces on the parallelepipedal rectifier diodes. They are connected to extensions 44 of the intermediate layers 43 with a current direction in the direction of the intermediate layers. The light-emitting diodes are connected to each other by contact bars 45. In the case of FIGURES 11 and 12 these also act as supply and discharge respectively for electrical current. As is evident from the figure each rectifying diode 1 is connected in series with a light-emitting diode 5 arranged at each of its edge surfaces. The rectifying and light-emitting diodes are arranged on a common base consisting of an electrically insulating layer 46, e.g. beryllium oxide and a cooling plate 47, e.g. of copper, arranged outside the base. Above the diodes a light-reflecting means, not shown, is placed, which directs and distributes the light generated in the light-emitting diodes 5 towards the rectifier diodes 1. It may be advantageous to arrange reflecting coatings on the surfaces of the light-emitting diodes which are facing the insulating layer 46.

In FIGURE 13, which shows in more detail an embodiment of a light-emitting diode 50, the P-doped zone of the diode is indicated at 51, its N-doped zone at 52 and the P-N-junction at 53. The diode constitutes a GaAs-diode, the N-conducting zone of which is Te-doped to an impurity concentration of about $10^{18}$ atoms per $cm.^3$ and P-conducting zone is Zn-doped to an impurity concentration of about $10^{20}$ atoms per $cm.^3$. The thickness of the P-conducting zone is 10$\mu$m. and of the N-conducting with a view to the manageability of the disc about 200 $\mu$m. The edge 54 of the disc is about 5 mm. and the edge 55 0.2–2 mm. The surfaces of the disc which are perpendicular to the P-N-junction are parallel ond flat-polished. On the surfaces of the diode which are parallel with the P-N-junction layer-shaped metal contacts 56 and supply and discharge conductors 57 and 58 are arranged.

In the diode 60 according to FIGURE 14, which is also a GaAs-diode with a P-conducting zone 61 doped with Zn to an impurity concentration of $10^{20}$ atoms per $cm.^3$ and with an epithactically grown N-conducting zone 62 doped with Te to an impurity concentration of $10^{18}$ atoms per $cm.^3$, the P-N-junction is indicated 63. The thickness is 10$\mu$m. both in the P-conducting zone 61 and the N-conducting zone 62. The lower part 64 consists of ZnSe of N-type with an impurity concentration of $10^{18}$–$10^{20}$ atoms per $cm.^3$. The thickness of the zone 64 is about 200 $\mu$m. The edge 65 of the disc is about 5 mm. and the edge 66 0.2–2 mm. As in the diode according to FIGURE 13 the surfaces of the disc perpendicular to the P-N-junction are parallel and flat-polished and the surfaces of the disc parallel with the P-N-junction are provided with metal contacts 67 and supply and discharge conductors 68 and 69.

In FIGURE 15, which shows in more detail an embodiment of a rectifier diode 70 of silicon, the highly P-doped zone of the diode is indicated at 71, its highly N-doped zone at 72 and its middle zone at 73. The P-conducting zone is doped with boron to an impurity concentration of $10^{18}$–$10^{20}$ atoms per $cm.^3$ and the N-conducting with phosphorus likewise to an impurity concentration of $10^{18}$–$10^{20}$ atoms per $cm.^3$. In the middle zone, which is N- or P-conducting, the impurity concentration is less than $10^{12}$ atoms per $cm.^3$. The P-N-junctions are indicated 74 and 75. The thickness of the P-conducting zone and of the N-conducting zone is 50 $\mu$m. and the thickness of the intermediate zone ca. 1 mm., the total width of the diode in the current direction being therefore ca. 1.1 mm. The edges 76 and 77 have the lengths 10 mm. and 1 mm. respectively.

In the arrangement according to FIGURE 16, which in all essentials corresponds to the arrangement according to FIGURE 11, five silicon diodes of the kind shown in FIGURE 15 are arranged adjacent to each other with interlying conducting layers in the way which is evident from FIGURE 12, where the conducting layers are indicated 43 and the diodes 1. At the edge surfaces of the rectifier diodes light-emitting diodes 50 or 60 of the kind shown in FIGURE 13 or 14 are arranged. The light-emitting diodes are connected in series with the rectifier diodes between the contacts 79 and 80. The photons sent out from the light-emitting diodes are reflected by the double-prisma 81, of e.g. glass, arranged above the diodes, the surfaces of which are curved in order that the photons shall be distributed evenly over the whole middle zones 73 of the rectifier diodes 70. The rectifier diodes 70 and the light-emitting diodes 50 (60) are mounted by an electrically insulating layer 82 with good heat conductivity, e.g. a 0.1 mm. thick beryllium oxide layer, on a cooling plate 83, e.g. a water-cooled 3–5 mm. thick copper plate. Between the insulating layer 82 and the cooling plate 83 it is preferable to arrange a plate 84 with a heat-expansion coefficient which lies between those of the insulating layer and the cooling plate in order to decrease the risk of crack formation. If the insulating layer 82 is of beryllium oxide and the cooling plate 83 of copper it is suitable to use e.g. molybdenum as the material in the intermediate plate 84. The device according to FIGURE 16 gives a blocking voltage of about 10 kv. under a loading with a current of about 10 A. The forward voltage drop is about 5 v.

In all the cases exemplified in the figure it is the surfaces of the middle zones of the rectifier diodes which have been subjected to light photons. It is however also possible to arrange the lighting internally through channels in the middle zones.

In order to further increase the loading capacity of the systems and to increase the efficiency of the light-emitting diodes it may be suitable to Peltier-cool the rectifier diodes or the light-emitting diodes or both types of diodes. With normal cooling elements a temperature lowering can be obtained of 25–30° C. at the cooling factor $\epsilon=1$. This means that the forward losses are then doubled compared with a system without Peltier cooling.

Even if only rectifier diodes of silicon have been directly exemplified, it is obvious that the invention is applicable to rectifier diodes of other materials, such as inter alia germanium.

As will be apparent from the foregoing examples, the width of the middle zone is substantially greater than the diffusion length which, for silicon, is approximately 0.4 mm.

What is claimed is:

1. Rectifier means comprising at least one rectifying semi-conductor body connected to a voltage source, said semi-conductor body having a middle zone with low conductivity and end zones of mutually opposite conductivity types arranged on both sides of the middle zone and with high conductivity in relation to that of the middle zone, and a light photon source arranged outside the semi-conductor body for introducing directly in the middle zone of the semi-conductor body, during the forward period of the semi-conductor body, light photons with substantial capacity to generate hole-electron pairs in the middle zone, said middle zone having a thickness substantially greater than the diffusion length, said source being connected in series with said semi-conductor body and said voltage source.

2. Rectifier means as claimed in claim 1 in which the light photon source is a light-emitting diode.

3. Rectifier means as claimed in claim 2, in which the light-emitting diode is arranged adjacent an outwardly-facing surface of the middle zone of the rectifying semi-conductor body and with the current direction of the light-emitting diode substantially parallel to the outward-facing surface of the middle zone.

4. Rectifier means as claimed in claim 2, in which the light-emitting diode is arranged adjacent an outwardly-facing surface of the middle zone of the rectifying semi-conductor body and with the current direction of the light-emitting diode substantially perpendicular to the outward-facing surface of the middle zone.

5. Rectifier means as claimed in claim 2 having a light reflecting means arranged to direct the photons generated in the light-emitting diode against an outwardly facing surface of the middle zone of the rectifying semi-conductor body.

6. Rectifier means as claimed in claim 5 having a common base, the semi-conductor body and the light-emitting diode being arranged on said common base, the light-reflecting means extending over the middle zone of the rectifying semi-conductor body and the light-emitting diode.

7. Rectifier means as claimed in claim 5, in which the rectifying semi-conductor body has the form of a disc with a central hole, the one end-zone of the semi-conductor body being arranged along the edge surfaces of the disc and the other end zone along the side surfaces of the central hole, the light-emitting diode being located adjacent the one opening of the central hole with the current direction of the light-emitting diode substantially perpendicular to the end surfaces of the disc.

8. Rectifier means as claimed in claim 5, comprising a plurality of rectifying semi-conductor bodies with substantially parallellepipedal form, arranged next to each other, intermediate conducting layers between said bodies, a side surface of one rectifying semi-conductor body with an end zone of one conductivity type facing a surface of an adjoining rectifying semi-conductor body with an end zone of the same conductivity type, said light-emitting diode being located outside the edge surfaces of the semi-conductor bodies, said intermediate conducting layers being connected to said light-emitting diode.

References Cited

UNITED STATES PATENTS

| | | | |
|---|---|---|---|
| 2,794,863 | 6/1957 | Roosbroeck. | |
| 2,986,591 | 5/1961 | Swanson et al. | |
| 3,043,958 | 7/1962 | Diemer | 250—217 |
| 3,229,104 | 1/1966 | Rutz | 250—227 X |
| 3,270,235 | 8/1966 | Loebner | 307—88.5 |
| 3,304,430 | 2/1967 | Biard et al. | 250—211 |

RALPH G. NILSON, *Primary Examiner.*

J. D. WALL, *Assistant Examiner.*